(12) United States Patent
Shu et al.

(10) Patent No.: US 12,374,922 B2
(45) Date of Patent: Jul. 29, 2025

(54) POWER REGULATION METHOD, APPARATUS, AND DEVICE FOR NEAR FIELD COMMUNICATION

(71) Applicant: Huawei Technologies Co., Ltd., Guangdong (CN)

(72) Inventors: Weiliang Shu, Dongguan (CN); Hongcheng You, Shenzhen (CN); Qitang Liu, Shenzhen (CN); Wingto Fan, Dongguan (CN); Yanding Liu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 401 days.

(21) Appl. No.: 18/157,703

(22) Filed: Jan. 20, 2023

(65) Prior Publication Data

US 2023/0155419 A1  May 18, 2023

Related U.S. Application Data

(63) Continuation of application No. PCT/CN2021/091949, filed on May 6, 2021.

(30) Foreign Application Priority Data

Jul. 24, 2020 (CN) .......................... 202010724870.9

(51) Int. Cl.
*H02J 50/12* (2016.01)
*H04B 5/79* (2024.01)

(52) U.S. Cl.
CPC ................ *H02J 50/12* (2016.02); *H04B 5/79* (2024.01)

(58) Field of Classification Search
CPC .................................. H02J 50/12; H04B 5/79
See application file for complete search history.

(56) References Cited

U.S. PATENT DOCUMENTS

| 8,204,531 | B2 | 6/2012 | Jin et al. |
| 9,722,448 | B2 | 8/2017 | Radovic et al. |
| 2009/0079271 | A1 | 3/2009 | Jin |
| 2017/0077996 | A1* | 3/2017 | Kim ........................ H04B 5/72 |

(Continued)

FOREIGN PATENT DOCUMENTS

| CN | 204030732 U | 12/2014 |
| CN | 108448670 A | 8/2018 |

(Continued)

*Primary Examiner* — David Bilodeau
(74) *Attorney, Agent, or Firm* — WOMBLE BOND DICKINSON (US) LLP

(57) ABSTRACT

A power regulation method, apparatus, and device for NFC communication and NFC charging are disclosed. The apparatus includes: an NFC power converter, an NFC coil, an NFC circuit, a controller, and a power regulator. The NFC power converter is configured to connect to a direct-current power supply and generate a high-frequency alternating-current output. The NFC coil is configured to generate/receive an NFC high-frequency magnetic field and transmit/receive NFC power or an NFC signal. The NFC circuit is connected to the NFC power converter and is configured to transmit/receive the high-frequency alternating-current output. The controller is configured to generate different power control signals based on different operating modes of an NFC apparatus.

20 Claims, 10 Drawing Sheets

(56) References Cited

U.S. PATENT DOCUMENTS

2017/0126021 A1    5/2017  Desrosiers et al.
2017/0331522 A1*  11/2017  Tangen .................. H04W 4/80
2019/0190567 A1*   6/2019  Moon ...................... H04B 5/72
2019/0214854 A1*   7/2019  Leem ..................... H02J 50/90

FOREIGN PATENT DOCUMENTS

CN    109742863 A    5/2019
CN    111970666 A    11/2020

* cited by examiner

POWER REGULATION METHOD, APPARATUS, AND DEVICE FOR NEAR FIELD COMMUNICATION

CROSS-REFERENCE TO RELATED APPLICATIONS

This application is a continuation of International Application No. PCT/CN2021/091949, filed on May 6, 2021, which claims priority to Chinese Patent Application No. 202010724870.9, filed on Jul. 24, 2020. The disclosures of the aforementioned applications are hereby incorporated by reference in their entireties.

TECHNICAL FIELD

Embodiments of the present disclosure relate generally to the field of communication, and more particularly, to power regulation of devices for near field communication.

BACKGROUND

Currently, an increasing quantity of electronic devices, such as a smartphone, a smartwatch, and a smart wristband, have a near field communication (NFC) function. The NFC function is widely used. For example, it can be used for payment. How to perform NFC wireless charging on a wearable product such as a watch, a wristband, and a wireless headset by using an existing NFC communication module in an electronic device has received attention and started to be studied.

Usually, wireless communication and wireless charging have different requirements for circuits. To solve this problem, a technical solution of adding additional circuits has been proposed. For example, two sets of coils and matching circuits are used. However, such an NFC apparatus requires a larger printed circuit board (PCB) area and more NFC coil mounting space. In addition, the use of two sets of coils and circuits increases costs.

SUMMARY

In general, embodiments of the present disclosure provide a technical solution for power regulation in near field communication.

According to a first aspect of embodiments of the present disclosure, an NFC apparatus is provided. The near field communication apparatus includes an NFC power converter, configured to connect to a direct-current power supply and generate a high-frequency alternating-current output. The near field communication apparatus further includes an NFC coil, configured to generate/receive an NFC high-frequency magnetic field and transmit/receive NFC power or an NFC signal. The near field communication apparatus further includes an NFC circuit connected to the NFC power converter and configured to transmit/receive a high-frequency alternating-current output. The near field communication apparatus further includes a controller, configured to generate different power control signals based on different operating modes of the NFC apparatus. The near field communication apparatus further includes a power regulator, configured to connect one end of the power regulator to the direct-current power supply and the other end of the power regulator to the NFC circuit, and configured to regulate, based on the different power control signals, at least one of a magnitude or a phase of power output to the NFC circuit. This solution achieves improved performance of wireless communication and/or wireless charging by injecting active power/reactive power according to different operating states of the NFC apparatus.

In some embodiments, the power regulator includes a direct-current/alternating-current converter, configured to be connected between the direct-current power supply and the NFC circuit and configured to implement mutual conversion between a first direct-current voltage and a first alternating-current voltage. The controller is further configured to regulate at least one of a magnitude or a phase of the first alternating-current voltage based on different operating modes.

In some embodiments, the power regulator further includes a direct-current/direct-current converter, connected between the direct-current/alternating-current converter and the NFC circuit and configured to implement mutual conversion between a second direct-current voltage and the first direct-current voltage.

In some embodiments, the direct-current/direct-current converter includes one of the following: a buck regulator, a boost regulator, a buck-boost regulator, and a low dropout regulator. The direct-current/alternating-current converter includes one of the following: a bidirectional direct-current/alternating-current full-bridge converter, a full-bridge inverter, and a half-bridge converter.

In some embodiments, the operating mode includes a wireless communication mode or a wireless charging mode.

In some embodiments, a detector is configured to detect an operating mode of the NFC apparatus based on at least one of the following: a communication protocol format used by the NFC apparatus, impedance information of the NFC apparatus, and power information of the NFC apparatus.

In some embodiments, the controller is configured to: when the operating mode is the wireless charging mode, generate a first type of power control signal, where the power regulator is configured to: based on the first type of power control signal, regulate a phase of power output to the NFC circuit to be in a same direction as a phase of power of the NFC circuit. In this way, an equivalent quality factor of the NFC circuit and the NFC coil can be increased and NFC charging efficiency can be improved.

In some embodiments, the controller is further configured to update the first type of power control signal based on at least one of power and impedance of the NFC apparatus in the wireless charging mode.

In some embodiments, the controller is configured to: when the operating mode is the wireless communication mode, generate a second type of power control signal, where the power regulator is configured to: based on the second type of power control signal, regulate a phase of power output to the NFC circuit to be in an opposite direction as a phase of power of the NFC circuit. In this way, an equivalent quality factor of the NFC circuit and the NFC coil can be decreased and an NFC communication requirement can be satisfied.

In some embodiments, the controller is further configured to update the second type of power control signal based on at least one of power and impedance of the NFC apparatus in the wireless communication mode.

In some embodiments, the controller is further configured to generate a power control signal based on an impedance nature of the NFC apparatus.

In some embodiments, the controller is further configured to: when the NFC apparatus is an inductive circuit, generate a third type of power control signal, where the power regulator is configured to: based on the third type of power control signal, regulate a phase difference between a phase of power output to the NFC circuit and a phase of power of the NFC circuit to a first predetermined phase difference, so that the NFC apparatus becomes a resistive circuit.

In some embodiments, the controller is further configured to: when the apparatus is a capacitive circuit, generate a fourth type of power control signal, where the power regulator is configured to: based on the fourth type of power control signal, regulate a phase difference between a phase of output power and a phase of power of the NFC circuit to a second predetermined phase difference, so that the NFC apparatus becomes a resistive circuit.

According to a second aspect of embodiments of the present disclosure, a power regulation method is provided. The method includes: A main circuit of NFC power conversion generates a high-frequency alternating-current output. The method further includes: An NFC coil generates/receives an NFC high-frequency magnetic field and transmits/receives NFC power or an NFC signal. The method further includes: An NFC circuit transmits/receives the high-frequency alternating-current output. The method further includes: A controller generates different power control signals based on different operating modes of an NFC apparatus. The method further includes: A power regulator regulates, based on the different power control signals, at least one of a magnitude and a phase of power output to the NFC apparatus. This solution achieves improved performance of wireless communication and/or wireless charging by injecting active power/reactive power according to different operating states of the NFC apparatus.

In some embodiments, the regulating at least one of a magnitude and a phase of power includes: A direct-current/alternating-current converter implements mutual conversion between a first direct-current voltage and a first alternating-current voltage; and the controller regulates at least one of a magnitude and a phase of the first alternating-current voltage based on the different operating modes.

In some embodiments, the power regulation method further includes: A direct-current/direct-current converter implements mutual conversion between a second direct-current voltage and the first direct-current voltage.

In some embodiments, the operating mode includes a wireless communication mode or a wireless charging mode.

In some embodiments, detecting an operating mode includes detecting an operating mode of the NFC apparatus based on at least one of the following: a communication protocol format used by the NFC apparatus, impedance information of the NFC apparatus, and power information of the NFC apparatus.

In some embodiments, the generating power control signals include: When the operating mode is the wireless charging mode, the controller generates a first type of power control signal, where the power regulator regulates, based on the first type of power control signal, a phase of power output to the NFC circuit to be in a same direction as a phase of power of the NFC circuit. In this way, an equivalent quality factor of the NFC apparatus and the NFC coil can be increased and NFC charging efficiency can be improved.

In some embodiments, the power regulation method further includes: The controller updates the first type of power control signal based on at least one of power and impedance of the NFC apparatus in the wireless charging mode.

In some embodiments, the generating power control signals include: When the operating mode is the wireless communication mode, the controller generates a second type of power control signal, where the power regulator regulates, based on the second type of power control signal, a phase of power output to the NFC circuit to be in an opposite direction as a phase of power of the NFC circuit. In this way, an equivalent quality factor of the NFC apparatus and the NFC coil can be decreased and an NFC communication requirement can be satisfied.

In some embodiments, the power regulation method further includes: The controller updates the second type of power control signal based on at least one of power or impedance of the NFC apparatus in the wireless communication mode.

In some embodiments, the power regulation method further includes: The controller generates a power control signal based on an impedance nature of the NFC apparatus.

In some embodiments, the generating power control signals include: When the NFC apparatus is an inductive circuit, the controller generates a third type of power control signal, where the power regulator regulates, based on the third type of power control signal, a phase difference between a phase of power output to the NFC circuit and a phase of power of the NFC circuit to a first predetermined phase difference, so that the NFC apparatus becomes a resistive circuit.

In some embodiments, the generating power control signals include: When a transceiver is a capacitive circuit, the controller generates a fourth type of power control signal, where the power regulator regulates, based on the fourth type of power control signal, a phase difference between a phase of output power and a phase of power of the NFC circuit to a second predetermined phase difference, so that the NFC apparatus becomes a resistive circuit.

According to a third aspect of embodiments of the present disclosure, a terminal device is provided. The terminal device includes a display panel and a housing, and a middle frame disposed between the display panel and the housing, where the near field communication apparatus according to the first aspect of the embodiments of the present disclosure is disposed on a side of the middle frame facing the housing.

It may be understood from the following description of example embodiments that an NFC power regulation circuit having active power and/or reactive power that are arbitrarily controllable in a magnitude and a direction is added according to the technical solutions proposed herein. The NFC power regulation circuit may inject corresponding required active power and/or reactive power into an NFC circuit based on an NFC receive end type and an operating state of an NFC apparatus that are detected, thereby implementing improved performance of wireless communication or wireless charging for the NFC apparatus.

It should be understood that the content described in the SUMMARY section is not intended to limit key or important features of the embodiments of the present disclosure, nor is it intended to limit the scope of the present disclosure. Other features of the present disclosure will be readily understood through the following description.

BRIEF DESCRIPTION OF DRAWINGS

Some example embodiments are described with reference to the accompanying drawings, where.

In all the accompanying drawings, identical or similar reference signs denote identical or similar elements.

DESCRIPTION OF EMBODIMENTS

Figure 1:
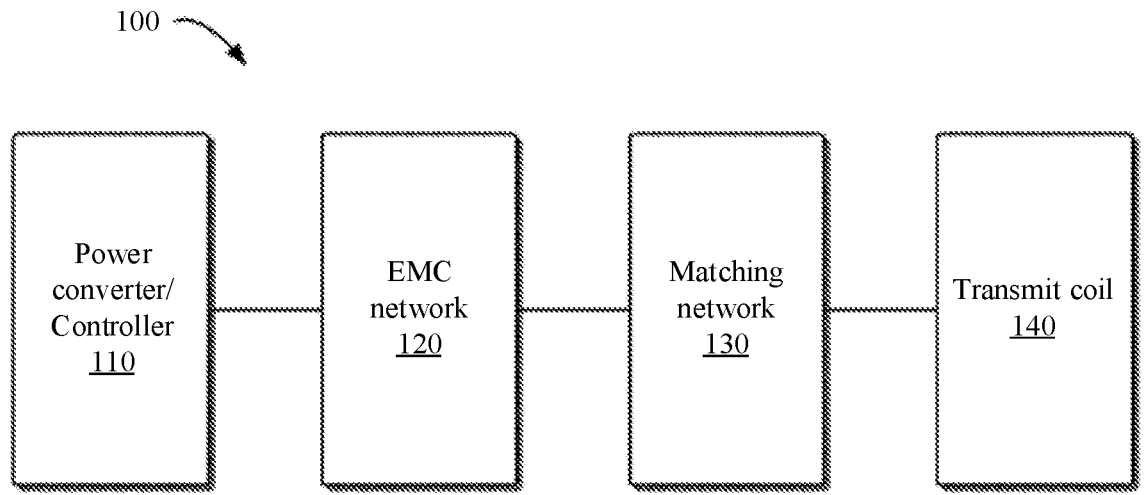
FIG. 1 is a schematic diagram of a structure of a circuit of a wireless communication/charging transmitter according to some conventional solutions.

The principles of the present disclosure are described with reference to some example embodiments. It should be understood that these embodiments are described for illustrative purposes only and to assist persons skilled in the art in understanding and implementing the present disclosure without imposing any limitation on the scope of the present disclosure. In addition to the manners described below, the implementations described in this specification may be implemented in various manners.

In the following descriptions and claims, unless otherwise defined, all technical and scientific terms used in this specification have the same meanings as those generally understood by persons of ordinary skill in the art to which the present disclosure belongs.

References to "an embodiment", "one embodiment", "example embodiment", and the like in the present disclosure indicate that the embodiment described may include particular features, structures, or characteristics, but it is not necessary that each embodiment includes the particular features, structures, or characteristics. Moreover, such phrases do not necessarily refer to a same embodiment. In addition, when a particular feature, structure, or characteristic is described in combination with an embodiment, it may be considered that combination of another embodiment affecting the feature, structure, or characteristic is well known to the persons killed in the art. There is no explicit description.

It should be understood that the terms "first", "second", and the like may be used in this specification to describe various elements, but these elements should not be limited by these terms. These terms are used only to distinguish one element from another. For example, without departing from a scope of an example embodiment, a first element may be referred to as a second element, and similarly, the second element may be referred to as the first element. As used in this specification, the term "and/or" includes any and all combinations of one or more listed terms.

The terms used in this specification are for the purpose of describing particular embodiments only and are not intended to limit example embodiments. As used in this specification, the singular forms "a", "an", and "the" are also intended to include plural forms unless the context expressly indicates otherwise. It will be further understood that, when used in this specification, the terms "include", "including", "have", "having", "comprise", and/or "comprising" designate the presence of the feature, element, component, and/or the like without excluding the presence or addition of one or more other features, elements, components and/or combinations thereof.

The term "circuit" used herein refers to one or more of the following:

(a) hardware circuit implementation only (such as implementations of analog and/or digital circuits only);

(b) a combination of a hardware circuit and software, such as (if applicable): (i) a combination of analog and/or digital hardware circuits and software/firmware, and (ii) any part of a hardware processor and software (including a digital signal processor, software, and a memory that work together to cause an apparatus such as a computing device to perform various functions); and (c) a hardware circuit and/or a processor, such as a microprocessor or a part of a microprocessor, which require software (for example, firmware) for operation, but may not include software when software is not required for operation.

The definition of a circuit is applicable to all scenarios of use of the term in this application (including any claim). As another example, the term "circuit" used herein also covers implementations of only a hardware circuit or processor (or a plurality of processors), a part of a hardware circuit or processor, or software or firmware accompanying a hardware circuit or processor. For example, if applicable to a particular claim element, the term "circuit" further covers a baseband integrated circuit, a processor integrated circuit, or a similar integrated circuit in another computing device.

In the embodiments of the present disclosure, the term "wireless charging" refers to that without electrical contact between a power transmit apparatus and a power receive apparatus, wireless energy transfer is performed across space (by using an electromagnetic field between the power transmit apparatus and the power receive apparatus). The term "near field communication" refers to communication applying magnetic coupling operation principles and may also be used for wireless charging. For example, an operating frequency for the near field communication and the wireless charging may be 13.56 MHz or another suitable frequency. Wireless power transfer may refer to transfer of any form of energy associated with an electric field, a magnetic field, an electromagnetic field, or another wireless field from a transmitter to a receiver without use of a physical electrical conductor (for example, power may be transferred through free space). Power output into a wireless field (for example, a magnetic field) may be received, captured, or coupled by a "receive coil" to implement power transfer.

The term "alternating-current resistance (ACR)" used in this specification refers to an alternating-current internal resistance value measured by a device port at a corresponding alternating-current operating frequency. The term "coil quality factor" is also referred to as a "Q value". A larger Q value indicates smaller coil loss, and a smaller Q value indicates greater coil loss. The term "active power" refers to alternating-current energy emitted or consumed per unit time. The "active power" is average power within a period and has a characteristic that a phase of an alternating-current voltage and a phase of an alternating-current current are in a same direction or opposite directions. The term "reactive power" refers to constant exchange of energy between a power supply and a reactance element (a capacitor or an inductor) with average power of zero within a period. A maximum value of the exchanged energy is the "reactive power". The reactive power has a characteristic that a phase of an alternating-current voltage lags behind or leads a phase of an alternating-current current by 90 degrees.

Wireless communication (for example, NFC communication) and wireless charging (for example, NFC charging) are very similar in terms of a circuit structure. As shown in FIG. 1, a circuit 100 of a wireless communication/charging transmitter includes a power converter/controller 110, an electromagnetic compatibility (EMC) network 120, a matching network 130, and a transmit coil 140. The power transmit/controller 110 is configured to generate a high-frequency alternating-current signal. The EMC network 120 may be configured to remove a higher-order harmonic component from a high-frequency square wave. The matching network 130 may be configured to reduce an alternating-current signal reflected by a load.

Wireless communication and wireless charging have different requirements for a circuit. For example, to be compatible with requirements of different wireless communication rates, a transmit coil used for wireless communication usually has a comparatively small Q value. If a wireless communication circuit and the transmit coil are directly used for NFC wireless charging, the comparatively small Q value of the coil will lead to great loss of a transmit coil for NFC wireless charging, low charging efficiency, and poor user experience. To achieve higher NFC wireless charging efficiency, it is usually required that a Q value of the transmit coil for NFC wireless charging be as large as possible, for example, Q>60. Therefore, there is a contradiction between Q values required for wireless communication and for wireless charging.

When an electronic device performs wireless charging, a Q value of an entire NFC apparatus is comparatively large, which causes that the NFC apparatus is comparatively sensitive to changes in coil inductance and capacitance parameters. When tolerances or offsets exist in these parameters, the NFC apparatus produces a comparatively large change in an imaginary part of impedance. This results in a comparatively large reactive current generated in the NFC apparatus, thereby reducing wireless charging power and efficiency. Therefore, it is difficult to achieve consistency in wireless charging characteristics.

Figure 2:
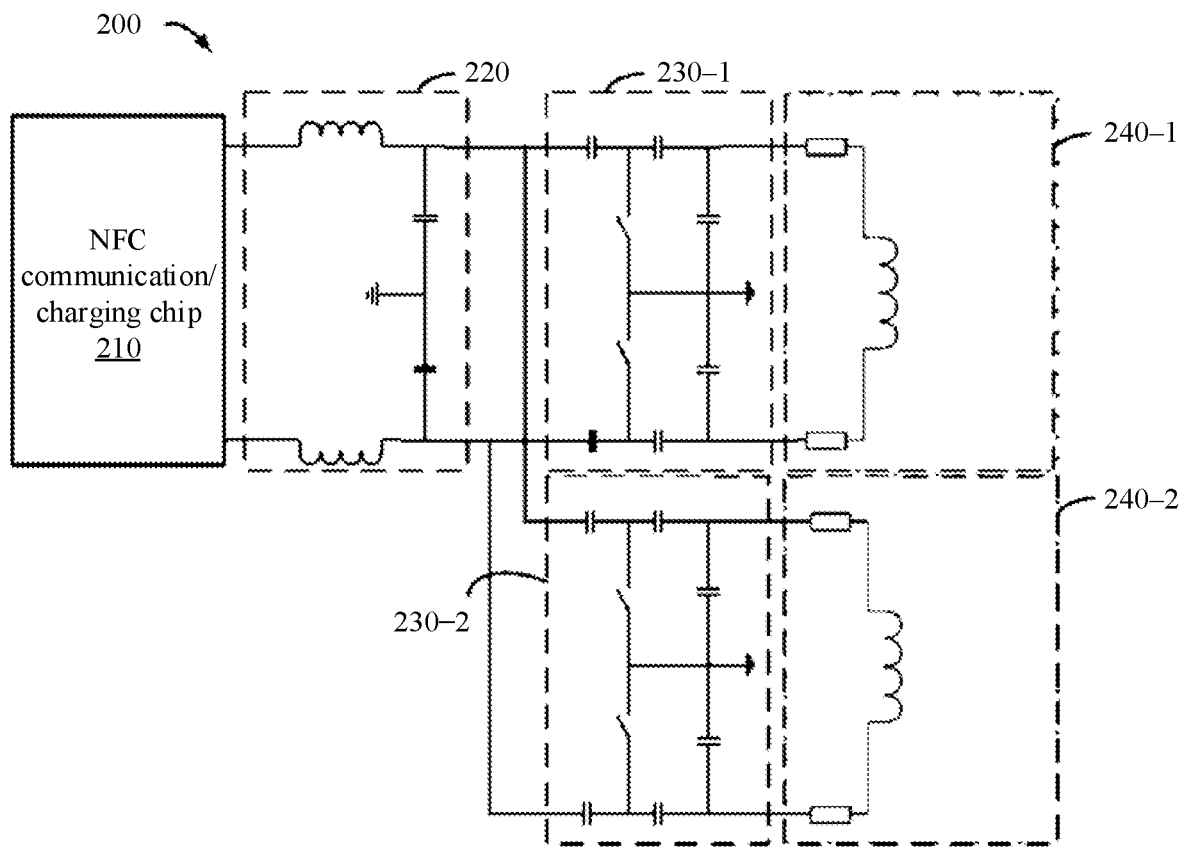
FIG. 2 is a schematic diagram of a structure of an NFC apparatus according to some conventional solutions.

According to some conventional technologies, a plurality of coils and circuits may be used to achieve compatibility between wireless communication and NFC wireless charging. For example, FIG. 2 is a schematic diagram of a structure of an NFC apparatus 200 according to some conventional solutions. The NFC apparatus 200 is an embodiment of the circuit 100 of a wireless communication/charging transmitter. The NFC apparatus 200 includes an NFC communication/charging chip 210, an EMC circuit 220, matching networks 230-1 and 230-2, and NFC transmit coils 240-1 and 240-2. The NFC transmit coil 240-1 may be set to have a comparatively small Q value for wireless communication. The NFC transmit coil 240-2 may be set to have a comparatively large Q value for NFC wireless charging. Compatibility between wireless communication and NFC wireless charging may be achieved by using two sets of coils and matching circuits. However, such an NFC apparatus requires a larger printed circuit board (PCB) area and more NFC coil mounting space. In addition, the use of two sets of coils and circuits increases costs.

Figure 3:
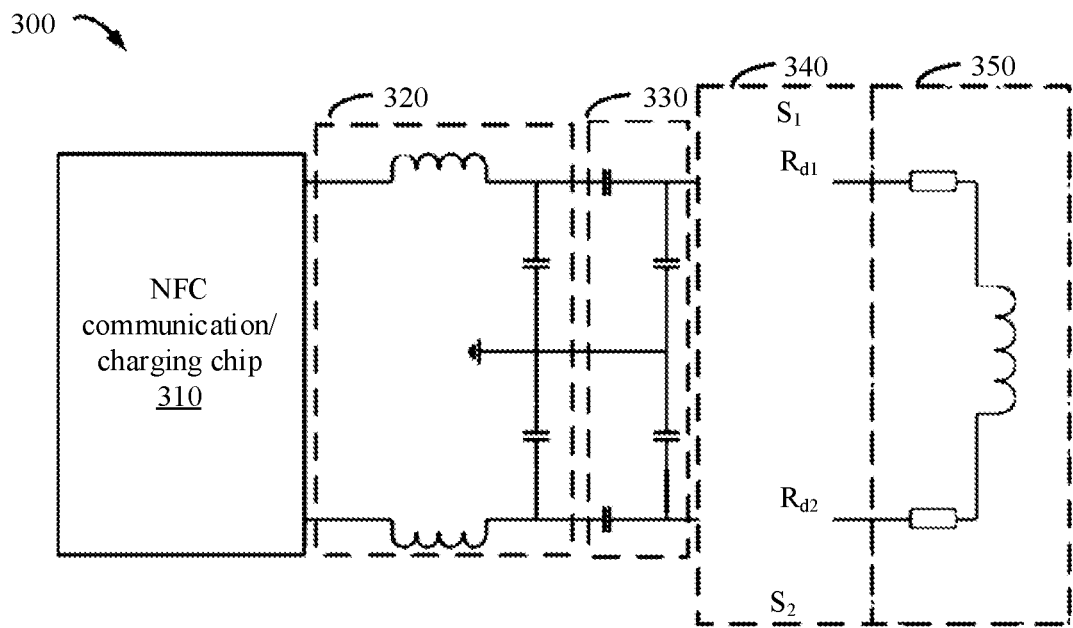
FIG. 3 is a schematic diagram of a structure of an NFC apparatus according to some conventional solutions.

In some other conventional technologies, an NFC coil may be regulated by resistors connected in series to achieve compatibility between wireless communication and NFC wireless charging. An NFC apparatus 300 is another embodiment of the circuit 100 of a wireless communication/charging transmitter. As shown in FIG. 3, the NFC apparatus 300 includes an NFC communication/charging chip 310, an EMC network 320, a matching network 330, a Q-value switching circuit 340, and an NFC coil 350. The Q-value switching circuit may include short-circuit resistors Rd1 and Rd2, and switches S1 and S2. Switching of a Q value may be implemented by connecting or disconnecting the switches S1 and S2. For example, in a wireless communication mode, the switches S1 and S2 are open, and the resistors Rd1 and Rd2 are connected in series to the circuit, so that an equivalent Q value of the NFC coil decreases to meet a wireless communication requirement. In a wireless charging mode, the resistors Rd1 and Rd2 may be short-circuited by closing the switches S1 and S2, so that the equivalent Q value of the NFC coil increases to meet a wireless charging requirement. However, driving the switches S1 and S2 is very complicated, and technical implementation is difficult.

Figure 4:
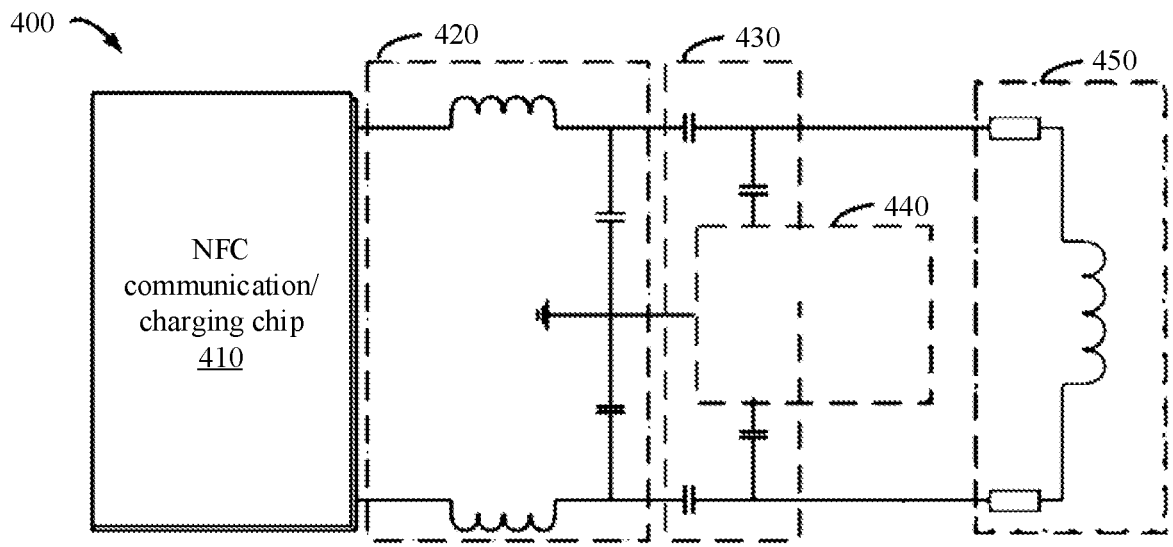
FIG. 4 is a schematic diagram of a structure of an NFC apparatus according to some conventional solutions.

The foregoing technologies are conventional solutions to solve a difference in Q value requirements between NFC wireless charging and wireless communication. It is difficult to solve the difference or implement the foregoing technologies if a resonance state changes due to an offset that exists in the inductance and capacitance parameters of the circuit, or if different impedance requirements of wireless communication and wireless charging are to be compatible. In some other conventional technologies, circuit parameters are regulated by changing capacitance to achieve compatibility between wireless communication and wireless charging. As shown in FIG. 4, an NFC apparatus 400 includes an NFC communication/charging chip 410, an EMC network 420, a matching network 430, a capacitance regulation circuit 440, and an NFC coil 450. Capacitance may be regulated so that the NFC apparatus is in a required impedance state. However, such technical solutions require an additional circuit, which increases costs and occupies a PCB.

Therefore, new technical solutions are required to achieve compatibility between wireless communication and NFC wireless charging. According to embodiments of the present disclosure, compatibility between wireless communication and NFC wireless charging can be achieved by adding a power regulation circuit having active power and/or reactive power that are controllable in a magnitude and a direction. In some embodiments, an excellent wireless communication or NFC wireless charging effect can be achieved by injecting correspondingly required active power and/or reactive power into an NFC circuit based on an NFC receive end type and an operating state of an NFC apparatus that are detected.

Figure 5:
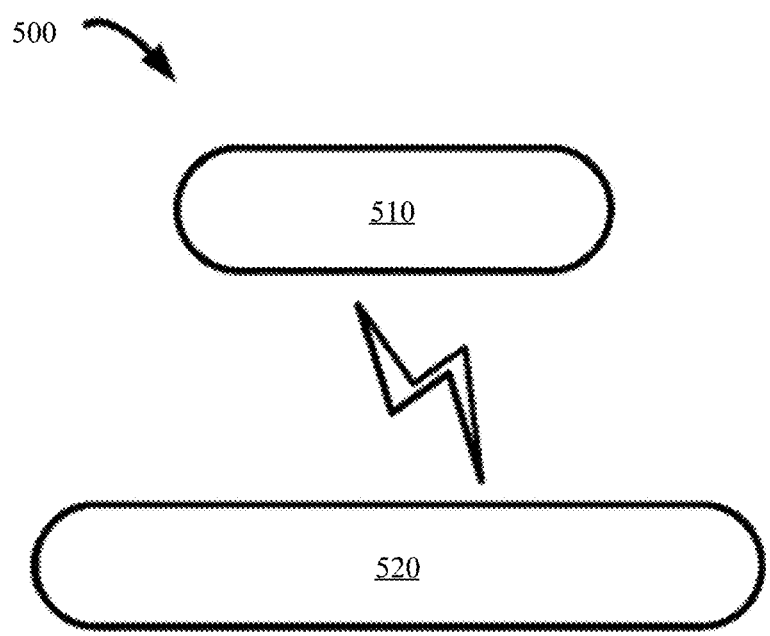
FIG. 5 is a schematic diagram of a structure in a wireless communication/charging scenario.

FIG. 5 is a schematic diagram of a structure in a wireless communication/charging scenario 500. The wireless communication/charging scenario 500 includes an NFC transmit end apparatus 510 and an NFC receive end apparatus 520 that may communicate with each other. The NFC transmit end apparatus 510 may provide input power from a power supply to a transmitter to generate a wireless (such as magnetic or electromagnetic) field for performing wireless power transfer. The NFC transmit end apparatus 510 and the NFC receive end apparatus 520 may be separated by a specific distance. The NFC receive end apparatus 520 may be coupled to the wireless field and generate, based on received wireless power, output power for storage and consumption.

The wireless field may be corresponding to a "near field" of the NFC transmit end apparatus 510. The near field may be corresponding to a region in which a strong reactance field is present. The strong reactance field is caused by a current and a charge in a transmit antenna of the NFC transmit end apparatus 510 and minimally radiates power from the transmit antenna. The near field may be corresponding to a region within about one wavelength (or fraction thereof) of the transmit antenna. The embodiments of the present disclosure may be applied to the NFC transmit end apparatus 510. In addition, the embodiments of the present disclosure may further be applied to the NFC receive end apparatus 520. Although FIG. 5 illustrates an NFC scenario as an example for description, it should be understood that the embodiments of the present disclosure may also be used in other suitable environments or systems that are currently known or developed in the future.

Figure 6A:
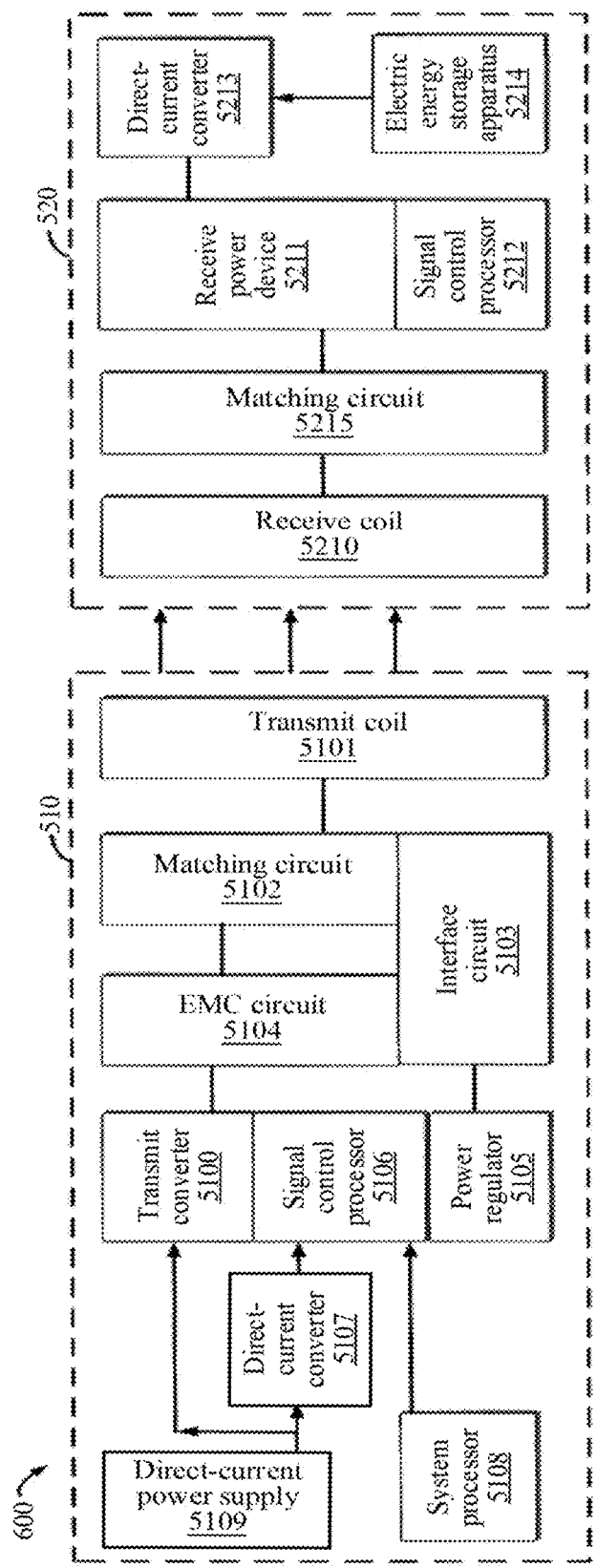
FIG. 6A is a schematic diagram of an architecture of a wireless communication/charging system.

FIG. 6A is a schematic diagram of a wireless communication/charging system 600 according to an example embodiment of the present disclosure. The wireless communication/charging system 600 includes the NFC transmit end apparatus 510 and the NFC receive end apparatus 520 shown in FIG. 5. It may be understood that the system structure shown in FIG. 6 is merely an example and does not impose a restriction. The wireless communication/charging system 600 may include other additional components not shown or omit some of the components shown, which is not limited in this embodiment of the present disclosure.

As an example, the NFC transmit end apparatus 510 includes a transmit converter 5100, a transmit coil 5101, a power regulator 5105, a signal control processor 5106, a matching circuit 5102, an EMC circuit 5104, a direct-current converter 5107, a system processor 5108, and a direct-current power supply 5109. It may be understood that the NFC transmit end apparatus 510 may include another suitable unit or module.

The direct-current power supply 5109 may supply power to each component of the NFC transmit end apparatus 510. The direct-current power supply 5109 may be a power supply, such as a battery, located inside the NFC transmit end apparatus 510. Alternatively, the direct-current power supply 5109 may be an external power supply externally connected to the NFC transmit end apparatus 510. The embodiments of the present disclosure are not limited in this respect. The direct-current converter 5107 may be powered by the direct-current power supply 5109. After direct-current voltage conversion is performed on a supply voltage output by the power supply 5109, the direct-current converter 5107 supplies a required voltage to the signal control processor 5106. The transmit converter 5100 may be powered by the direct-current power supply 5109, or powered by the direct-current power supply 5109 through the direct-current converter 5107, and a direct current is converted into a high-frequency alternating current.

Because the transmit converter 5100 emits a high-frequency square wave, the high-frequency square wave includes more higher-order harmonic components. If the high-frequency square wave is transmitted by the NFC transmit coil 5101 without any processing, serious electromagnetic interference is caused. The higher-order harmonic waves pass through the EMC circuit 5104 (for example, including a series/parallel network of inductors/capacitors) and then become comparatively complete sine waves. The matching circuit 5102 may include devices of a capacitor and/or an inductor and reduce an alternating-current signal reflected by a load, to meet a power output requirement of the direct-current converter 5107. The NFC transmit coil 5101 is configured to generate/receive an NFC high-frequency magnetic field and transmit/receive an NFC signal.

In some embodiments, the power regulator 5105 may be configured to generate power of any magnitude and phase. Specific examples are described in detail below. An interface circuit 5103 includes an inductor and a capacitor, and is configured to connect the power regulator 5105, the matching circuit 5102, and the EMC circuit 5104. The transmit coil 5101 generates a high-frequency magnetic field to transmit energy to the NFC receive end apparatus 520 in a wireless manner. The signal control processor 5106 is configured to process a signal generated in a communication/charging process, and control and drive the power regulator 5105 in the NFC transmit end apparatus 510. The system processor 5108 is configured to process information of another process and the like.

As an example, the NFC receive end apparatus 520 includes a receive coil 5210, a receive power device 5211, a signal control processor 5212, a direct-current converter 5213, an electric energy storage apparatus 5214, and a matching circuit 5215. Some components of the NFC receive end apparatus 520 and some components of the NFC transmit end apparatus 510 have same or similar names, and also have same or similar operations and functions. Details are not described herein again.

The receive coil 5210 may be configured to receive a wireless signal and/or power in the high-frequency magnetic field. The receive power device 5211 may convert a high-frequency alternating current received by the receive coil 5210 into a direct current. The matching circuit 5215 includes devices that are mainly an inductor and a capacitor and performs matching on impedance characteristics. For example, impedance at a receive end may be matched to resistive impedance, inductive impedance, or capacitive impedance.

In some embodiments, a direct current obtained through conversion by the receive power device 5211 may be used to provide electric energy to the signal control processor 5212. In other embodiments, a direct current obtained through conversion by the receive power device 5211 may be processed by the direct-current converter 5213 or charge the electric energy storage apparatus 5214.

The signal control processing unit is configured to process a signal generated in a communication/charging process, and control and drive a power circuit in the receive power device 5211. The direct-current converter 5213 converts a direct current received from the receive power device 5211 to charge the electric energy storage apparatus 5214. The electric energy storage apparatus 5214 may be configured to store energy received from the receive coil 5210.

Figure 6B:
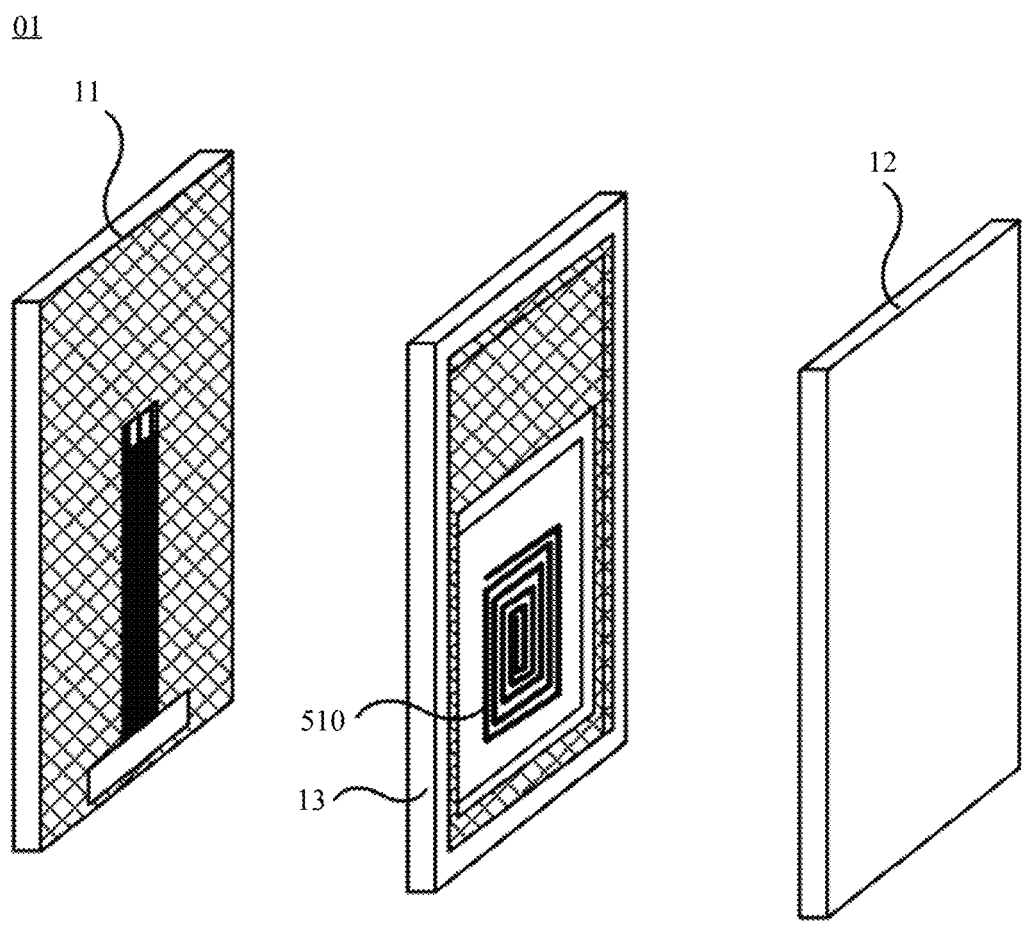
FIG. 6B is a schematic diagram of a structure of a terminal device according to an embodiment of the present disclosure.

FIG. 6B is a schematic diagram of a structure of a terminal device 01 according to an embodiment of the present disclosure. For example, when the terminal device 01 is a mobile phone, as shown in FIG. 6B, the terminal device 01 mainly includes a display panel (DP) 11. The display panel 11 may be a liquid crystal display (LCD) panel or an organic light emitting diode (OLED) display panel. This is not limited in this application. The terminal device 01 further includes a middle frame 13 and a housing 12 shown in FIG. 6B. The display panel 11 and the housing 12 are respectively located on two sides of the middle frame 13. A back surface of the display panel 11 faces the housing 12, and the display panel 11 and the housing 12 are connected through the middle frame 13. The NFC transmit end apparatus 510 shown in FIG. 6A as an example may be disposed on a side of the middle frame 13.

Figure 7:
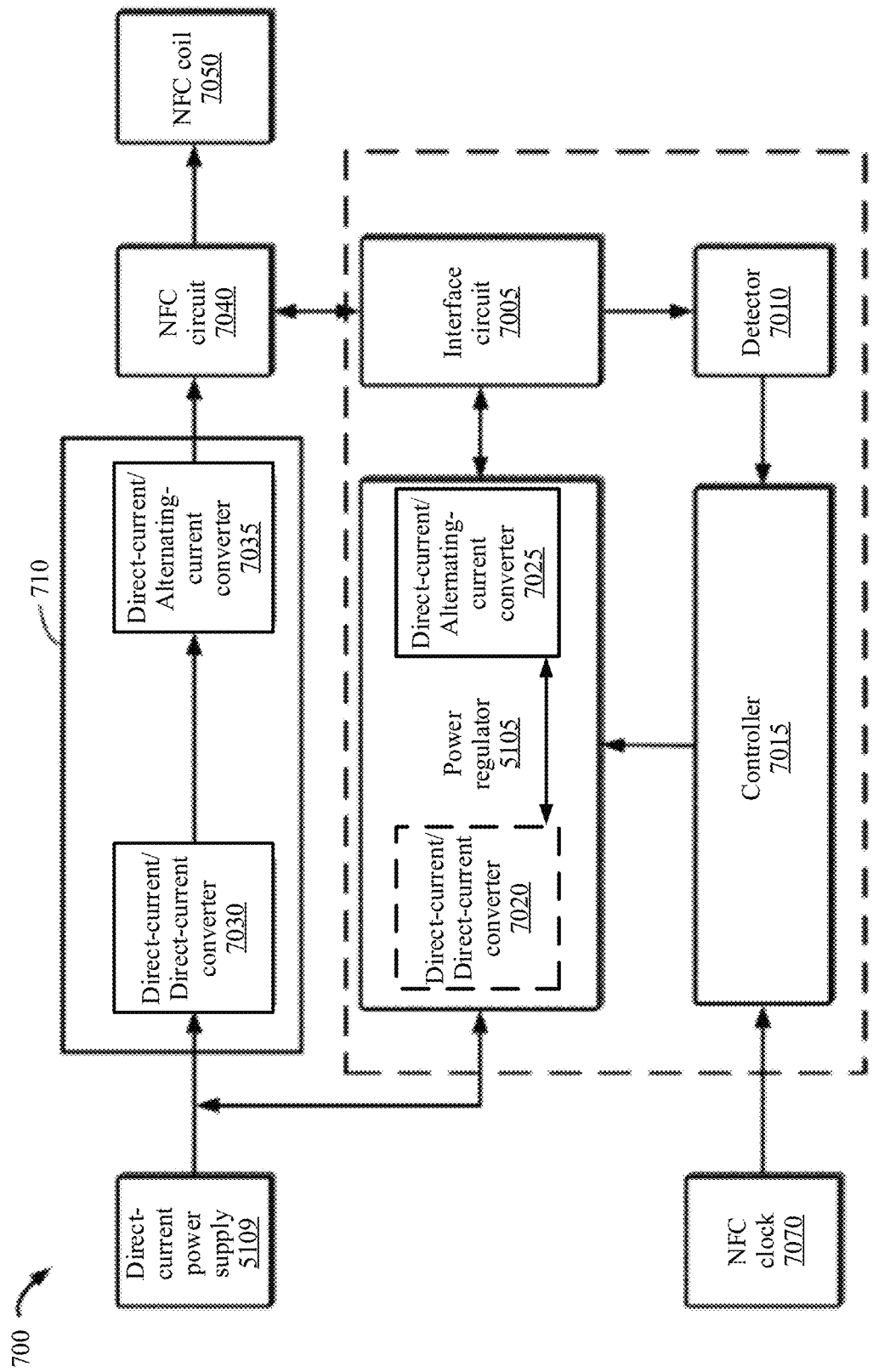
FIG. 7 is a diagram of a structure of an NFC apparatus according to an embodiment of the present disclosure.

FIG. 7 is a diagram of a structure of an NFC apparatus 700 as an example according to an embodiment of the present disclosure. The NFC apparatus 700 may include other additional components not shown or omit some of the components shown, which is not limited in this embodiment of the present disclosure. Some components in FIG. 7 and some components in FIG. 6A have same or similar names, and have similar operations and functions. Details are not described herein again. The NFC apparatus 700 may be implemented in the terminal device 01 shown in FIG. 6B. For example, the NFC apparatus 700 may be disposed on a side that is of the middle frame 13 and that faces the housing 12. It may be understood that connection manners of elements in the NFC apparatus 700 that are shown in FIG. 7 are merely an example and do not impose a restriction.

The NFC apparatus 700 includes a direct-current power supply 5109, an NFC power converter 710, an NFC circuit 7040, and an NFC coil 7050. In some implementations, the NFC power converter 710 may include a direct-current/direct-current converter 7030 and a direct-current/alternating-current converter 7035. In some embodiments, the NFC circuit 7040 may further include the EMC circuit 5104 and the matching circuit 5102 that are shown in FIG. 6. The direct-current/direct-current converter 7030 and the direct-current/alternating-current converter 7035 may be combined to form the direct-current converter 5107 shown in FIG. 6.

The NFC apparatus 700 further includes an interface circuit 7005, a controller 7015, and a power regulator 5105. In some embodiments, the NFC apparatus 700 further includes a detector 7010. The interface circuit 7005 may include an inductor and a capacitor. In some embodiments, the interface circuit 7005 may be the same as the interface circuit 5103 shown in FIG. 6. In some embodiments, the detector 7010 and the controller 7015 may be implemented in the signal control processor 5106. Therefore, in the embodiments of the present disclosure, existing NFC chips, circuits, and coils may be reused, thereby reducing costs and reducing mounting space. Compared with conventional technologies, the NFC apparatus according to the embodiments of the present disclosure implements Q value switching and impedance regulation by using the controller 7015 and the power regulator 5105, and can meet different requirements of wireless communication/charging. In addition, injected power is regulated by the power regulator 5105, so that compatibility between wireless communication and NFC charging is achieved, and mode switching is efficient.

The controller 7015 is configured to generate different power control signals based on different operating modes of the NFC apparatus 700 to regulate at least one of a magnitude or a phase of power generated by the power regulator 5105. One end of the power regulator 5105 is connected to the direct-current power supply 5109, and the other end is connected to the NFC circuit 7040. The power regulator 5105 regulates, based on the different power control signals, at least one of a magnitude or a phase of power output to the NFC circuit 7040. In some embodiments, the power regulator may include a direct-current/alternating-current converter 7025. Additionally, in some embodiments, the power regulator 5105 may further include a direct-current/direct-current converter 7020, thereby further implementing control of the magnitude of the power output to the NFC circuit 4040. In some embodiments, the detector 7010 is connected to the NFC circuit 7040 through the interface circuit 7005. The detector 7010 is configured to detect an operating mode of the NFC apparatus 700. For example, the detector 7010 may determine whether the NFC apparatus 700 is in a wireless communication mode or an NFC wireless charging mode. If the NFC apparatus 700 is in the wireless communication mode, the NFC circuit 7040 requires a small Q value. If the NFC apparatus 700 is in the NFC charging mode, the NFC circuit 7040 requires a large Q value. In some embodiments, the detector 7010 may determine the operating mode of the NFC apparatus 700 based on a communication protocol format used by the NFC apparatus 700. Additionally or alternatively, an operating manner of the NFC circuit 7040 may be determined by using impedance information and/or power information (that is, power during an operation of the NFC circuit) of the NFC apparatus 700. In this way, impedance and/or power of the NFC apparatus may be regulated based on the different operating modes, so that the NFC apparatus is in a suitable operating state. It may be understood that the operating mode of the NFC apparatus 700 may be determined by any suitable component.

In some embodiments, the power regulator 5105 may obtain active power from the NFC circuit 7040 through the interface circuit 7005, thereby forming an equivalent load on the NFC circuit 7040. In some embodiments, the power regulator 5105 may perform direct-current/alternating-current power conversion on the active power obtained. The power obtained after conversion by the power regulator 5105 may be transmitted backward, to be supplied as auxiliary power to the NFC power converter 710. As an example for illustration only, if power required by the NFC power converter 710 is P1, in the absence of the power that is obtained after conversion by the power regulator 5105 and that is transmitted backward, the direct-current power supply 5109 needs to supply the power P1 to the NFC power converter 710. If the power (represented as P2) obtained after conversion by the power regulator 5105 is transmitted backward, the direct-current power supply 5109 needs to supply power P1-P2 to the NFC power converter 710. In this way, power recovery is implemented, and power consumption of the NFC apparatus 700 is reduced. In other embodiments, the active power obtained may be directly consumed by the power regulator 5105 without being transmitted backward. As shown in FIG. 7, the controller 7015 may be connected to an NFC clock 7070 and be at a same frequency as the NFC clock 7070. In some embodiments, the controller 7015 may generate a power control signal to control phase leading or lagging. The power control signal serves as a drive signal (frequency and phase) of a power switching transistor in the direct-current/alternating-current converter 7025, thereby controlling a relative phase of an alternating-current port voltage/current of the direct-current/alternating-current converter 7025. Additionally, the controller 7015 may further regulate an output voltage of the direct-current/direct-current converter 7020, or regulate a drive duty ratio or a phase shift angle of the direct-current/alternating-current converter 7025, thereby controlling an amplitude of the alternating-current port voltage/current of the direct-current/alternating-current converter 7025. In this way, more convenient and more accurate Q value regulation and impedance regulation of the NFC apparatus are implemented.

The direct-current/direct-current converter 7020 is configured to receive a current from the power supply 5109, perform conversion, and supply power to the direct-current/alternating-current converter 7025. In other embodiments, the direct-current/direct-current converter 7020 may further be configured to receive electric energy from the direct-current/alternating-current converter 7025 and transmit backward the electric energy to the power supply 5109. The direct-current/direct-current converter 7020 may be a buck regulator. Alternatively, a boost regulator may be used as the direct-current/direct-current converter 7020. In other embodiments, the direct-current/direct-current converter 7020 may be a bidirectional buck-boost regulator or a low dropout regulator, and the embodiments of the present disclosure are not limited in this respect.

In the wireless communication mode, the direct-current/alternating-current converter 7025 may be configured to convert a direct current into an alternating current, and transmit the alternating current to the NFC circuit 7040 through the interface circuit 7005. In the NFC charging mode, the direct-current/alternating-current converter 7025 may further be configured to convert an alternating current obtained from the NFC circuit 7040 through the interface circuit 7005 into a direct current, and transmit the direct current back to the direct-current/direct-current converter 7020. In some embodiments, the direct-current/alternating-current converter 7025 may be a direct-current/alternating-current full-bridge converter. Alternatively, a full-bridge inverter may also be used as the direct-current/alternating-current converter 7025. In other embodiments, the direct-current/alternating-current converter 7025 may be a half-bridge converter.

Figure 8:
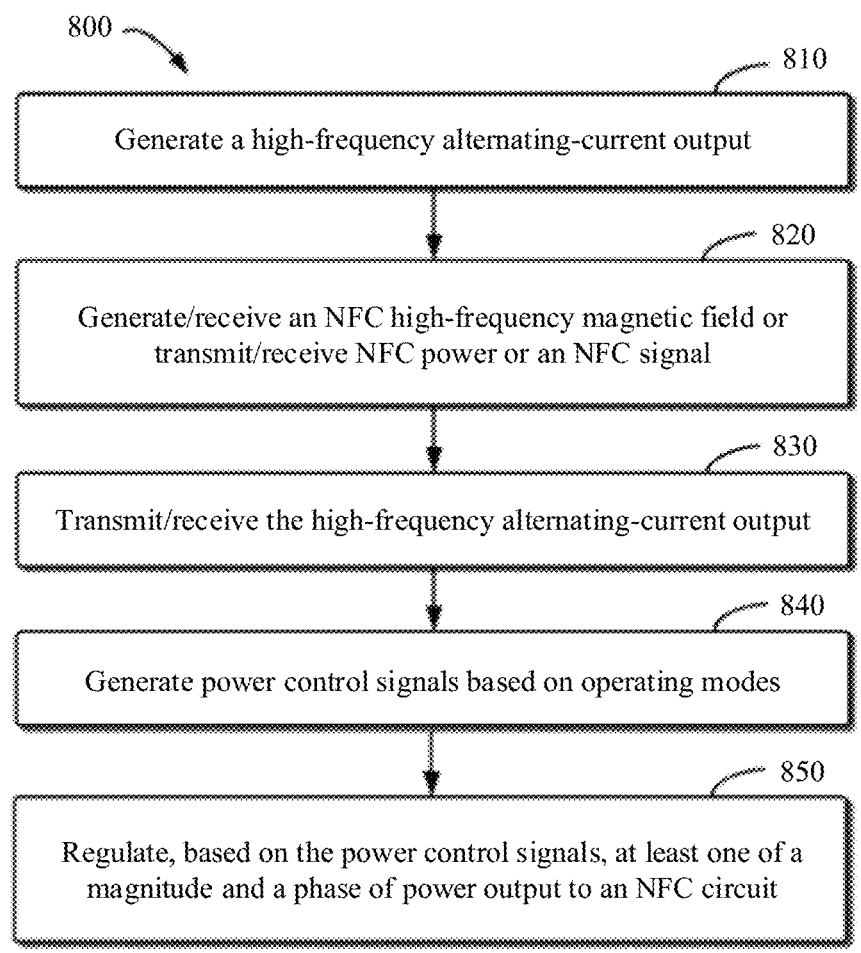
FIG. 8 is a flowchart of a method according to an embodiment of the present disclosure.

The embodiments of the present disclosure are further described below with reference to FIG. 7 and FIG. 8. FIG. 8 is a flowchart of a power regulation method 800 according to an example embodiment of the present disclosure. The method shown in FIG. 8 may be implemented by the NFC apparatus 700 shown in FIG. 7. It should be understood that the method shown in FIG. 8 may include other additional operations not shown, or some of the operations shown may be omitted. The scope of the present disclosure is not limited thereto.

In block 810, the NFC power converter 710 generates a high-frequency alternating-current output. As described above, the NFC power converter 710 may include the direct-current/direct-current converter 7030 and the direct-current/alternating-current converter 7035. For example, the direct-current/direct-current converter 7030 is configured to receive a current from the power supply 5109, perform conversion, and supply power to the direct-current/alternating-current converter 7035. The direct-current/alternating-current converter 7035 may be configured to convert a direct current into an alternating current, and transmit the alternating current to the NFC circuit 7040.

In block 820, the NFC coil 7050 generates/receives an NFC high-frequency magnetic field and transmits/receives NFC power or an NFC signal.

In block 830, the NFC circuit 7040 transmits/receives the high-frequency alternating-current output. For example, when the NFC circuit 7040 is in a wireless communication mode, the NFC circuit 7040 may transmit a high-frequency alternating-current electrical signal to the NFC receive end apparatus 520 and the like. In other embodiments, if the NFC circuit 7040 is in an NFC charging mode, the NFC circuit 7040 may further receive a high-frequency alternating-current electrical signal used for charging the direct-current power supply 5109.

In some embodiments, an operating mode of the NFC apparatus 700 may be determined. For example, the operating mode may include the wireless communication mode. The operating mode may further include the wireless charging mode. In some embodiments, the detector 7010 may determine the operating mode of the NFC apparatus 700 based on a communication protocol format used by the NFC apparatus 700. Because signals used for wireless communication and NFC charging use different communication protocols, the detector 7010 may determine the operating mode by using the communication protocol format. In some embodiments, the detector 7010 may detect impedance information of the NFC apparatus 700. Alternatively, impedance information of the NFC apparatus 700 may be detected by the detector 7010.

In some embodiments, circuit parameters used for different operating modes of the NFC apparatus 700 may be set. These circuit parameters may be set to default parameter values. As an example, when the detector 7010 determines that the NFC apparatus 700 is in the wireless communication mode, a magnitude and a phase of default injected power in the communication mode (for example, injected by the power regulator 5105) may be applied to the NFC circuit. For example, a phase of injected power and a phase of power of the NFC circuit 7040 are in opposite directions. In other embodiments, when the detector 7010 determines that the NFC apparatus 700 is in the wireless charging mode, a magnitude and a phase of default injected power in the charging mode may be applied to the NFC circuit. For example, a phase of injected power and a phase of power of the NFC circuit 7040 may be in a same direction by default.

In block 840, the controller 7015 generates different power control signals based on the different operating modes of the NFC apparatus 700. In some embodiments, as described above, default circuit parameters used for the different operating manners of the NFC circuit 7040 may be set, and the controller 7015 may generate, based on information about the NFC circuit 7040 determined by the detector 7010, a power control signal used for updating the default circuit parameters. In other embodiments, the controller 7015 may generate, based on information about the NFC circuit 7040 determined by the detector 7010, a power control signal without a need for default circuit parameters. In this way, more convenient and more accurate Q value regulation and impedance regulation can be implemented. Further, the controller 7015 may determine a magnitude and a direction of the injected power based on the operating mode, to implement a wireless communication function or an NFC wireless charging function, so that the NFC apparatus operates in an optimal state.

In some embodiments, the controller 7015 may generate power control signals (referred to as a "first group of power control signals") used for the direct-current/alternating-current converter 7025 based on the operating mode, for regulating a magnitude and a phase of an alternating-current voltage output by the direct-current/alternating-current converter 7025. When the power regulator 5105 may further include the direct-current/direct-current converter 7020, in some embodiments, the controller 7015 may generate power control signals (referred to as a "second group of power control signals") used for the direct-current/direct-current converter 7020 based on the operating mode, for regulating a magnitude of a direct-current voltage output by the direct-current/direct-current converter 7020.

As described above, the wireless communication mode and the NFC charging mode have different requirements for a circuit. For example, if the NFC apparatus 700 is in the wireless communication mode, the NFC apparatus 700 requires a small Q value. If the NFC apparatus 700 is in the NFC charging mode, the NFC apparatus 700 requires a large Q value. The Q value of the NFC apparatus 700 may be regulated by using a magnitude and a direction of injected active power.

As an example, if the operating mode of the NFC apparatus 700 is the wireless charging mode, active power in a same direction as active power in the NFC circuit 7040 needs to be injected. In this case, the controller 7015 may generate a power control signal (referred to as a "first type of power control signal") so that a phase of power output to the NFC circuit 7040 is regulated to be in a same direction as a phase of power of the NFC circuit 7040. In this way, an equivalent quality factor of the NFC circuit 7040 and the NFC coil are increased and NFC charging efficiency is improved. In some embodiments, the controller 7015 may update the first type of power control signal. For example, the controller 7015 may update the first type of power control signal based on power of the NFC circuit 7040 in the wireless charging mode. Alternatively, the first power control signal may be updated by the controller 7015 based on impedance of the NFC apparatus 700 in the wireless charging mode.

If the operating mode of the NFC apparatus 700 is the wireless communication mode, active power in an opposite direction as the NFC circuit 7040 needs to be injected. In this case, the controller 7015 may generate a power control signal (referred to as a "second type of power control signal") so that a phase of power output to the NFC circuit 7040 is regulated to be in an opposite direction as a phase of power of the NFC circuit 7040. In this way, equivalent Q values of the NFC circuit 7040 and the NFC coil are decreased and a Q value required for NFC communication is achieved. That is, active power is obtained from the NFC circuit 7040, and is consumed or recovered to a direct-current source. Specifically, the power regulator 5105 may obtain the active power of the NFC circuit 7040 through the interface circuit 7005, to form an equivalent load on the NFC circuit 7040. In some embodiments, the power regulator 5105 may perform direct-current/alternating-current power conversion on the active power obtained. The power obtained after conversion by the power regulator 5105 may be transmitted backward, to be supplied as auxiliary power to the NFC power converter 710. In this way, power recovery is implemented, and power consumption of the NFC apparatus 700 is reduced. In other embodiments, the active power obtained may be directly consumed by the power regulator 5105 without being transmitted backward. In some embodiments, the controller 7015 may update the second type of power control signal. For example, the controller 7015 may update the second type of power control signal based on power, impedance, or both of the NFC apparatus 700 in the wireless communication mode.

Impedance of the NFC circuit 7040 may be regulated by changing a magnitude and a direction of injected reactive power. As an example, if the detector 7010 determines that the NFC apparatus 700 is an inductive circuit, leading reactive power, that is, capacitive reactive power, needs to be injected. In this case, the controller 7015 may generate a power control signal (referred to as a "third type of power control signal"), so that a phase difference between a phase of power output to the NFC circuit 7040 and a phase of power of the NFC circuit 7040 is regulated to a first predetermined phase difference, thereby changing the NFC apparatus 700 into a resistive circuit.

If the detector 7010 determines that the NFC apparatus 700 is a capacitive circuit, lagging reactive power, that is, inductive reactive power, needs to be injected. In this case, the controller 7015 may generate a power control signal (referred to as a "fourth type of power control signal"), so that a phase difference between a phase of power output to the NFC circuit 7040 and a phase of power of the NFC circuit 7040 is regulated to a second predetermined phase difference, thereby changing the NFC apparatus 700 into a resistive circuit.

The controller 7015 may generate any suitable power control signal based on the circuit parameters of the NFC apparatus 700, to regulate the phase of the power output to the NFC circuit 7040, thereby achieving required injected power. Table 1 shows a relationship between injected power and a phase difference. It may be understood that values shown in Table 1 are merely an example and do not impose a restriction.

TABLE 1

| Δθ Value or Interval | Δθ Change | Power |
| --- | --- | --- |
| 0° | — | Injected active power |
| 180°/−180° | — | Absorbed active power |
| 90° | — | Injected capacitive reactive power |
| −90° | — | Injected inductive reactive power |
| −180° to −90° | Increase | Absorbed active power decreases, and injected inductive reactive power increases |
| | Decrease | Absorbed active power increases, and injected inductive reactive power decreases |
| −90° to 0° | Increase | Injected active power increases, and injected inductive reactive power decreases |
| | Decrease | Injected active power decreases, and injected inductive reactive power increases |
| 0° to 90° | Increase | Injected active power decreases, and injected capacitive reactive power increases |
| | Decrease | Injected active power increases, and injected capacitive reactive power decreases |
| 90° to 180° | Increase | Absorbed active power increases, and injected capacitive reactive power decreases |
| | Decrease | Absorbed active power decreases, and injected capacitive reactive power increases |

In block 850, the power regulator 5015 regulates, based on the power control signals, at least one of a magnitude or a phase of the power output to the NFC circuit 7040. In some implementations, the direct-current/alternating-current converter 7025 in the power regulator 5015 may perform mutual conversion between a first direct-current voltage and a first alternating-current power supply and regulate a magnitude and a phase of an output alternating-current voltage based on the first group of power control signals. Alternatively, if the power regulator 5015 includes the direct-current/direct-current converter 7020, the direct-current/direct-current converter 7020 may implement mutual conversion between a second direct-current voltage and a first direct-current voltage that is provided to the direct-current/alternating-current converter 7025. The direct-current/direct-current converter 7020 may further regulate a magnitude of the first direct-current voltage based on the second group of power control signals.

Figure 9:
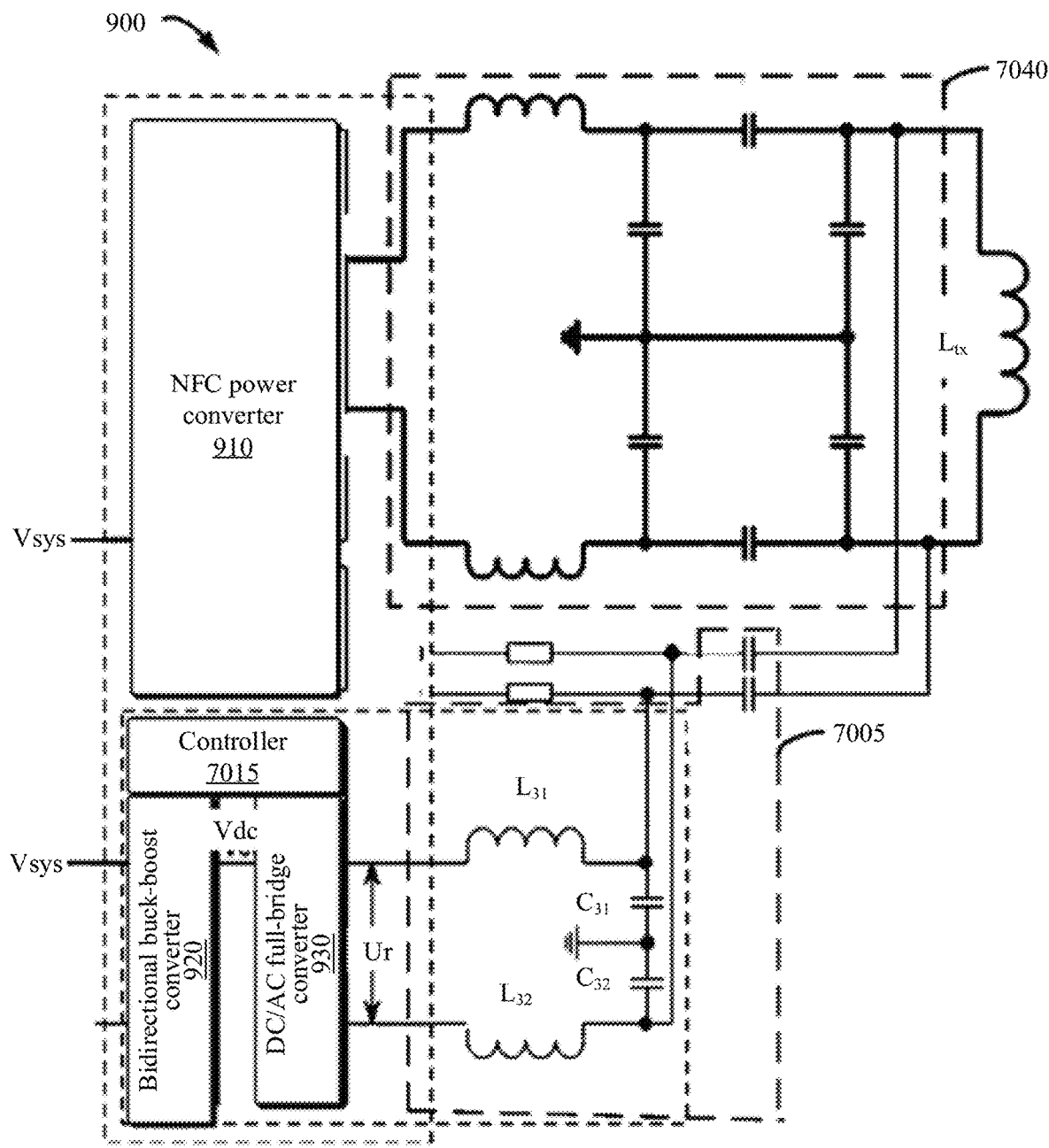
FIG. 9 is a diagram of a structure of an NFC apparatus according to an example embodiment of the present disclosure.

FIG. 9 is a diagram of a structure of an NFC apparatus 900 according to an example embodiment of the present disclosure. The NFC apparatus 900 shown in FIG. 9 is merely an example and does not impose a restriction. The NFC apparatus 900 may be an example embodiment of the NFC apparatus 700. The NFC apparatus 900 may simultaneously regulate a Q value and impedance of the NFC apparatus, so that the NFC apparatus 900 can not only operate in an efficient NFC wireless charging mode, but also operate in a wireless communication mode that meets a compatibility requirement.

As shown in FIG. 9, the NFC apparatus 900 includes an NFC power converter 910, an NFC circuit 7040, a controller 7015, a direct-current/direct-current converter (shown as a bidirectional buck-boost converter 920), a direct-current/alternating-current converter (shown as a DC/AC full-bridge converter 930), and an interface circuit 9005. FIG. 9 further includes other devices not shown, such as a detector.

Referring to FIG. 9, the bidirectional buck-boost converter 920 is configured to control bidirectional flow of energy and control a direct-current port voltage Vdc of the post-stage DC/AC full-bridge converter 930. For example, the bidirectional buck-boost converter 920 converts a direct-current voltage Vsys into the direct-current voltage Vdc. The DC/AC full-bridge converter 930 is configured to invert the direct-current voltage Vdc into an alternating-current voltage Ur for output, and may also rectify the alternating-current voltage Ur to the direct-current voltage Vdc. The interface circuit 7005 is configured to inject the port voltage Ur of the DC/AC full-bridge converter 930 into the NFC circuit 7040. The interface circuit 7005 may include an inductor and a capacitor, for example, L31, C31, C32, and L32. A power supply to the NFC power converter 910 also provides the direct-current voltage Vsys.

The controller 7015 is configured to control an amplitude of the port voltage Vdc of the bidirectional buck-boost converter 920 and an amplitude of the port voltage Ur of the DC/AC full-bridge converter 930. The controller 7015 may be further configured to control a phase difference of the port voltage Ur of the DC/AC full-bridge converter 930 relative to the NFC circuit 7040. Therefore, a phase and an amplitude of power of the NFC circuit 7040 can be arbitrarily controlled through phase/amplitude control. The bidirectional buck-boost converter 920, the DC/AC full-bridge converter 930, the controller 7015, and the NFC power converter 910 may be integrated into an NFC chip by using a semiconductor process. In addition, arbitrary regulation of a Q value and impedance can be implemented by adding only a few passive devices (inductors and capacitors) at the periphery. This manner can save a PCB board surface and effectively control costs.

Figure 10:
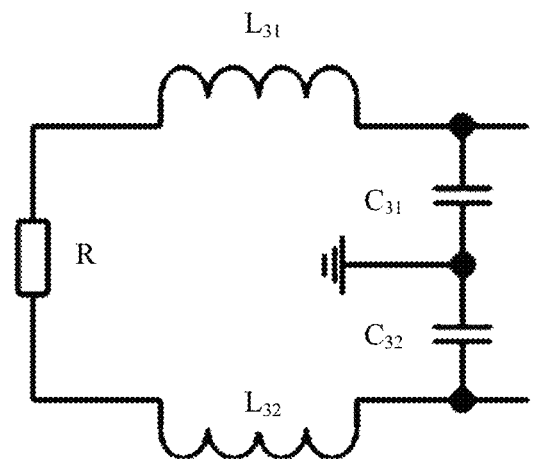
FIG. 10 is a schematic diagram of an equivalent circuit according to an embodiment of the present disclosure.
Figure 11:
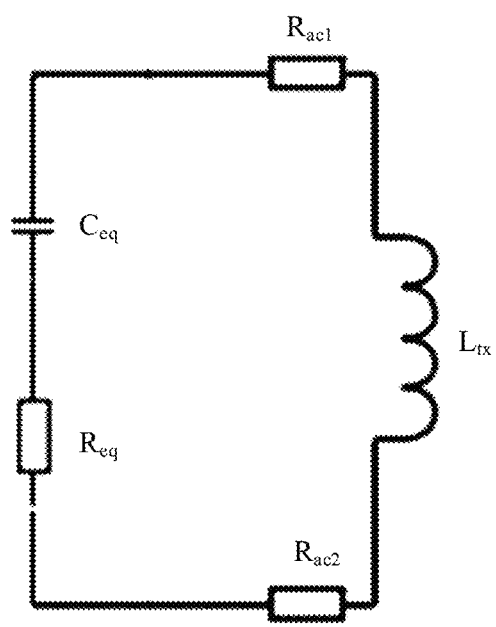
FIG. 11 is a schematic diagram of an equivalent circuit according to an embodiment of the present disclosure.

According to the NFC apparatus 900 shown in FIG. 9, if circuit impedance of the NFC circuit 7040 is to be regulated, only reactive power needs to be injected into the NFC circuit 7040. Because average power of the reactive power is zero, energy is exchanged between a device that rectifies an alternating current to a direct current and a passive device, and theoretically, active power is not obtained from a direct-current source. If a Q value of the NFC circuit 7040 is to be regulated, active power of the NFC circuit 7040 may be obtained by using the DC/AC full-bridge converter 930, and the active power is fed back to the direct-current source to form load resistance R that is arbitrarily regulated. As shown in FIG. 10, an equivalent resistor of the full-bridge converter may be expressed as R. To simplify analysis, a parasitic inductor, a parasitic capacitor, and an equivalent resistor of an EMC network and a matching network are ignored first. Through circuit-based equivalent conversion, they can be equivalent to a resistor Req and a capacitor Ceq that are connected in series, as shown in FIG. 11. Then, they are connected to a transmit coil Ltx in parallel (as shown in FIG. 9 and FIG. 11). When the resistor R does not exist, the Q value of the system is $Q=2\times\pi\times f\times Ltx/(Rac1+Rac2)$, and the Q value is large, which is used in the NFC wireless charging mode. When the resistor R exists, the Q value of the system is $Q=2\times\pi\times f\times Ltx/(Rac1+Rac2+Req)$, and the Q value is small, which is used in the wireless communication mode.

Figure 12:
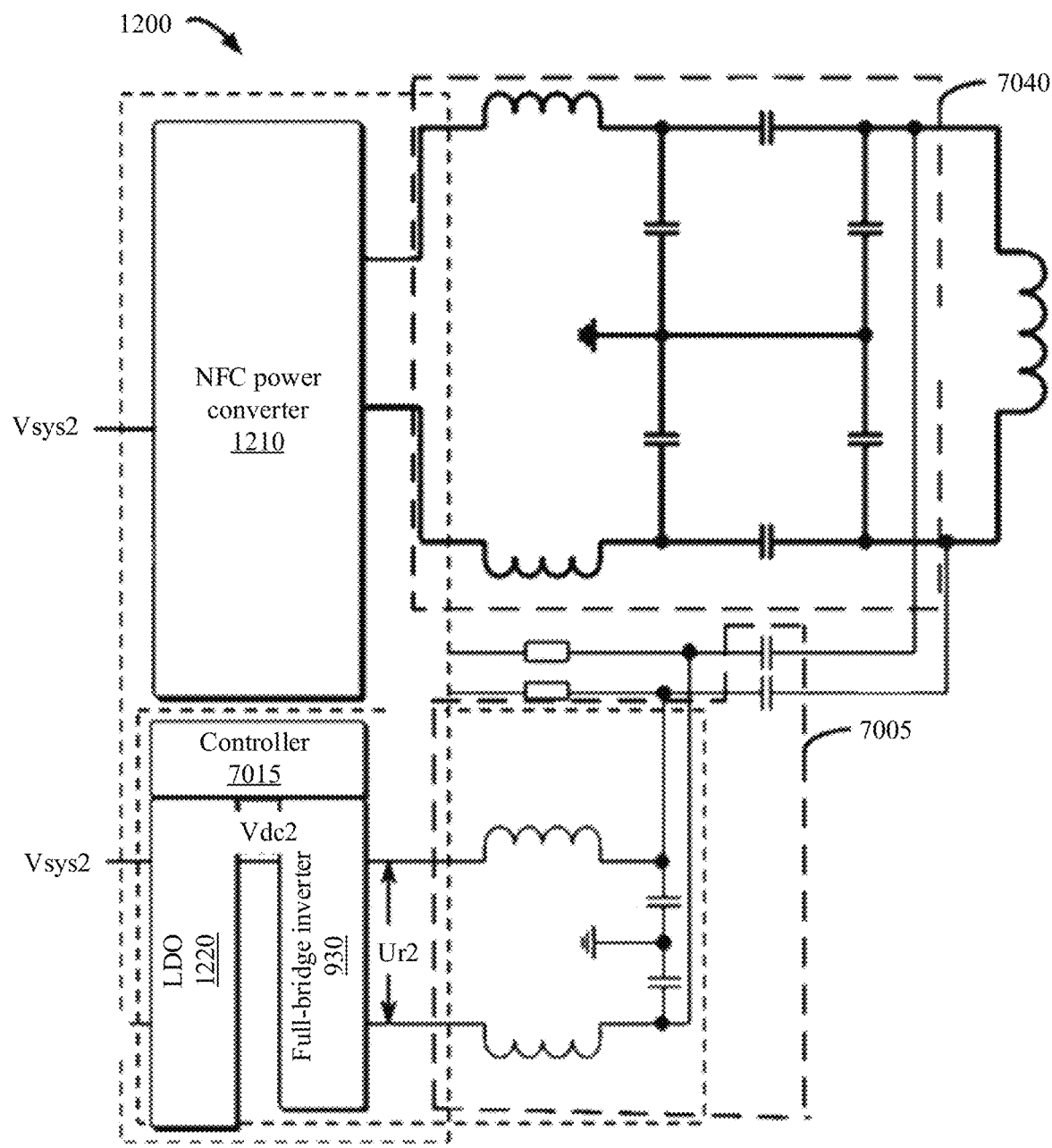
FIG. 12 is a diagram of a structure of an NFC apparatus according to another example embodiment of the present disclosure.

FIG. 12 is a diagram of a structure of an NFC apparatus according to another example embodiment of the present disclosure. The NFC apparatus 1200 shown in FIG. 12 is merely an example and does not impose a restriction. The NFC apparatus 1200 may be an example embodiment of the NFC apparatus 700. The NFC apparatus 1200 may simultaneously regulate a Q value and impedance of the NFC apparatus, so that the NFC apparatus 1200 can not only operate in an efficient NFC wireless charging mode, but also operate in a wireless communication mode that meets a compatibility requirement.

As shown in FIG. 12, the NFC apparatus 900 includes an NFC power converter 1210, an NFC circuit 7040, a controller 7015, a direct-current/direct-current converter (shown as an LDO 1220 through which a unidirectional current flows), a direct-current/alternating-current converter (shown as a full-bridge inverter 1230), and an interface circuit 7005. It should be understood that the NFC apparatus 900 shown in FIG. 12 is merely an example and does not impose a restriction. FIG. 12 may further include other devices not shown, such as a detector.

Referring to FIG. 12, the LDO 1220 is configured to control bidirectional flow of energy and control a direct-current port voltage Vdc2 of the post-stage full-bridge inverter 1230. For example, the LDO 1220 converts a direct-current voltage Vsys2 into the direct-current voltage Vdc2. The full-bridge inverter 1230 is configured to invert the direct-current voltage Vdc2 into an alternating-current voltage Ur2 for output, and may also rectify the alternating-current voltage Ur2 to the direct-current voltage Vdc2. The interface circuit 7005 is configured to inject the port voltage Ur2 of the full-bridge inverter 1230 into the NFC circuit 7040.

The controller 7015 is configured to control the LDO 1220 to output the voltage Vdc2 or control a drive duty ratio or a phase shift angle of the full-bridge inverter 1230. The controller 7015 is further configured to control phases of a drive signal of the full-bridge inverter 1230 and a master clock.

According to the NFC apparatus 1200 shown in FIG. 12, if circuit impedance of the NFC circuit 7040 is to be regulated, only reactive power needs to be injected into the NFC circuit 7040. Because average power of the reactive power is zero, energy is exchanged between a device that rectifies an alternating current to a direct current and a passive device, and theoretically, active power is not obtained from a direct-current source. The NFC apparatus 1200 implements Q value regulation of the NFC circuit in an energy consumption manner. If a Q value of the NFC circuit 7040 is to be regulated, regulation of the Q value may be implemented by using arbitrarily regulated resistance that is achieved through a power device of the full-bridge inverter 1230 and resistors connected in series.

In addition, similarly, the LDO 1220, the full-bridge inverter 1230, the controller 7015, and the NFC power converter 1210 may be integrated into an NFC chip by using a semiconductor process. In addition, arbitrary regulation of a Q value and impedance can be implemented by adding only a few passive devices (inductors and capacitors) at the periphery. This manner can save a PCB board surface and effectively decrease costs.

In general, the various example embodiments of the present disclosure may be implemented in hardware or dedicated circuits, software, logic, or any combination thereof. Some aspects may be implemented in hardware. Other aspects may be implemented in firmware or software that may be executed by controllers, microprocessors, or other computing devices. When various aspects of the embodiments of the present disclosure are illustrated or described as block diagrams, flowcharts, or using some other graphical representation, it is appreciated that the blocks, apparatuses, systems, technologies, or methods described herein may be implemented as non-restrictive examples in hardware, software, firmware, dedicated circuits or logic, general-purpose hardware or controllers, or other computing devices, or some combination thereof. Examples of hardware devices that may be used to implement the embodiments of the present disclosure include but are not limited to: a field programmable gate array (FPGA), an application-specific integrated circuit (ASIC), an application-specific standard product (ASSP), a system-on-chip (SOC), a complex programmable logic device (CPLD), and the like.

As an example, the embodiments of the present disclosure may be described in context of machine executable instructions. The machine executable instructions are, for example, included in program modules executed in a device of a target real or virtual processor. In general, the program modules include routines, programs, libraries, objects, classes, components, data structures, and the like, and perform specific tasks or implement specific abstract data structures. In various embodiments, functions of the program modules may be merged or split between the described program modules. The machine executable instructions used for the program modules may be executed locally or in a distributed device. In the distributed device, the program modules may be located in both local and remote storage media.

Computer program code used to implement the method of the present disclosure may be written in one or more programming languages. The computer program code may be provided to a processor of a general-purpose computer, a dedicated computer, or another programmable data processing apparatus. In this case, when the program code is executed by the computer or the another programmable data processing apparatus, the program code causes functions/operations specified in the flowcharts and/or block diagrams to be implemented. The program code may be executed entirely on the computer, partially on the computer, as a standalone software package, partially on the computer and partially on a remote computer, or entirely on a remote computer or server.

In the context of the present disclosure, the computer program code or associated data may be carried by any suitable carrier to enable a device, an apparatus, or a processor to execute the various processing and operations described above. Examples of the carrier include a signal, a computer readable medium, and the like.

Examples of the signal may include a propagating signal in an electrical, optical, radio, sound, or other form, such as a carrier or an infrared signal.

A machine readable medium may be any tangible medium including or storing programs used for or related to an instruction execution system, apparatus, or device. The machine readable medium may be a machine readable signal medium or a machine readable storage medium. The machine readable medium may include but is not limited to an electronic, magnetic, optical, electromagnetic, infrared, or semiconductor system, apparatus, or device, or any suitable combination thereof. More detailed examples of the machine readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

In addition, although operations are depicted in a particular order, this should not be understood as requiring such operations to be completed in the particular order shown or in sequential order, or all of the illustrated operations to be performed to obtain a desired result. In some cases, multi-tasking or parallel processing may be advantageous. Likewise, although the discussion above includes some specific implementation details, this should not be construed as a limitation on the scope of any disclosure or claim, but rather as a description of a specific embodiment that may be directed to a particular disclosure. Some features described in the context of separate embodiments in this specification may also be incorporated and implemented in a single embodiment. Conversely, various features described in the context of a single embodiment may also be implemented separately in a plurality of embodiments or in any suitable sub-combination.

Although the subject matter has been described in a language specific to structural features and/or method actions, it should be understood that the subject matter defined in the appended claims is not limited to the particular features or actions described above. Instead, the particular features and actions described above are disclosed as example forms for implementing the claims.

What is claimed is:

1. A near field communication (NFC) apparatus, comprising:
   an NFC power converter configured to connect to a direct-current power supply and generate a high-frequency alternating-current output;
   an NFC coil configured to generate an NFC high-frequency magnetic field and transmit an NFC power or an NFC signal;
   an NFC circuit connected to the NFC power converter and the NFC coil, configured to transmit the high-frequency alternating-current output;
   a controller configured to generate different power control signals based on different operating modes of the NFC apparatus; and
   a power regulator having a first end and a second end, the first end configured to connect to the direct-current power supply and the second end configured to connect to the NFC circuit, the power regulator configured to regulate, based on the different power control signals, at least one of a magnitude or a phase of a power output to the NFC circuit.

2. The apparatus according to claim 1, wherein the power regulator comprises:

a direct-current to alternating-current converter, configured to be connected between the direct-current power supply and the NFC circuit and configured to implement mutual conversion between a first direct-current voltage and a first alternating-current voltage; and the controller is further configured to regulate at least one of a magnitude or a phase of the first alternating-current voltage based on the different operating modes.

3. The apparatus according to claim 2, wherein the power regulator further comprises:
a direct-current to direct-current converter, connected between the direct-current/alternating-current converter and the NFC circuit and configured to implement mutual conversion between a second direct-current voltage and the first direct-current voltage.

4. The apparatus according to claim 3, wherein the direct-current to direct-current converter comprises one of: a buck regulator, a boost regulator, a bidirectional buck-boost regulator, or a low dropout regulator; and
the direct-current to alternating-current converter comprises one of: a bidirectional direct-current/alternating-current full-bridge converter, a full-bridge inverter, or a half-bridge converter.

5. The apparatus according to claim 1, wherein the operating mode comprises a wireless communication mode or a wireless charging mode.

6. The apparatus according to claim 1, wherein a detector is configured to detect an operating mode of the NFC apparatus based on at least one of:
a communication protocol format used by the NFC apparatus,
impedance information of the NFC apparatus, or
power information of the NFC apparatus.

7. The apparatus according to claim 5, wherein the controller is configured to:
when the operating mode is the wireless communication mode, generate a second type of power control signal; and
the power regulator is configured to: based on the second type of power control signal, regulate the phase of the power output to the NFC circuit to be in an opposite direction as a phase of a power of the NFC circuit.

8. The apparatus according to claim 1, wherein
the controller is further configured to generate a power control signal based on an impedance nature of the NFC apparatus.

9. The apparatus according to claim 8, wherein the controller is further configured to:
when the NFC apparatus is a capacitive circuit, generate a fourth type of power control signal; and
the power regulator is configured to: based on the fourth type of power control signal, regulate a phase difference between the phase of the power output and the phase of the power of the NFC circuit to a second predetermined phase difference, wherein the NFC apparatus becomes a resistive circuit.

10. A power regulation method, comprising:
generating, by an NFC power converter, a high-frequency alternating-current output;
generating, by an NFC coil, an NFC high-frequency magnetic field, and transmitting an NFC power or an NFC signal;
transmitting, by an NFC circuit, the high-frequency alternating-current output;
generating, by a controller, different power control signals based on different operating modes of an NFC apparatus; and regulating, by a power regulator, based on the different power control signals, at least one of a magnitude or a phase of a power output to the NFC circuit.

11. The method according to claim 10, wherein the regulating at least one of the magnitude or the phase of the power comprises:
implementing, by a direct-current to/alternating-current converter, mutual conversion between a first direct-current voltage and a first alternating-current voltage; and
regulating, by the controller, at least one of a magnitude or a phase of the first alternating-current voltage based on the different operating modes.

12. The method according to claim 11, further comprising:
implementing, by a direct-current to direct-current converter, mutual conversion between a second direct-current voltage and the first direct-current voltage.

13. The method according to claim 10, wherein the operating mode comprises a wireless communication mode or a wireless charging mode.

14. The method according to claim 10, wherein detecting an operating mode comprises detecting an operating mode of the NFC apparatus based on at least one of:
a communication protocol format used by the NFC apparatus,
impedance information of the NFC apparatus, or
power information of the NFC apparatus.

15. The method according to claim 13, wherein the generating power control signals comprises:
when the operating mode is the wireless charging mode, generating, by the controller, a first type of power control signal; and wherein the regulating, by a power regulator, based on the different power control signals, at least one of a magnitude or a phase of a power output to the NFC circuit comprises
regulating, by the power regulator, based on the first type of power control signal, the phase of the power output to the NFC circuit to be in a same direction as a phase of a power of the NFC circuit.

16. The method according to claim 15, further comprising:
detecting, by a detector, at least one of a power or an impedance of the NFC apparatus in the wireless charging mode; and
updating, by the controller, the first type of power control signal based on at least one of the detected power or the detected impedance.

17. The method according to claim 13, wherein the generating power control signals comprises:
when the operating mode is the wireless communication mode, generating, by the controller, a second type of power control signal; and wherein the regulating, by a power regulator, based on the different power control signals, at least one of a magnitude or a phase of a power output to the NFC circuit comprises
regulating, by the power regulator, based on the second type of power control signal, the phase of the power output to the NFC circuit to be in an opposite direction as the phase of the power of the NFC circuit.

18. The method according to claim 10, further comprising:
generating, by the controller, the power control signal based on an impedance nature of the NFC apparatus.

19. The method according to claim 18, wherein the generating the power control signal comprises:

when the NFC apparatus is an inductive circuit, generating, by the controller, a third type of power control signal; and wherein the regulating, by a power regulator, based on the different power control signals, at least one of a magnitude or a phase of a power output to the NFC circuit comprises regulating, by the power regulator, based on the third type of power control signal, a phase difference between the phase of the power output to the NFC circuit and the phase of the power of the NFC circuit to a first predetermined phase difference, wherein the NFC apparatus becomes a resistive circuit.

20. A terminal device, comprising:

a display panel and a housing, and a middle frame disposed between the display panel and the housing, wherein a near field communication NFC apparatus is disposed on a side of the middle frame facing the housing, wherein the near field communication NFC apparatus, comprising:

an NFC power converter configured to connect to a direct-current power supply and generate a high-frequency alternating-current output;

an NFC coil configured to generate an NFC high-frequency magnetic field and transmit an NFC power or an NFC signal;

an NFC circuit connected to the NFC power converter and the NFC coil, configured to transmit the high-frequency alternating-current output;

a controller configured to generate different power control signals based on different operating modes of the NFC apparatus; and a power regulator having a first end and a second end, the first end configured to connect to the direct-current power supply and the second end configured to connect to the NFC circuit, the power regulator configured to regulate, based on the different power control signals, at least one of a magnitude or a phase of a power output to the NFC circuit.

* * * * *